March 20, 1934. H. P. PEARSON ET AL 1,951,769
MANUFACTURE OF GRANULAR ASPHALT
Filed April 12, 1929
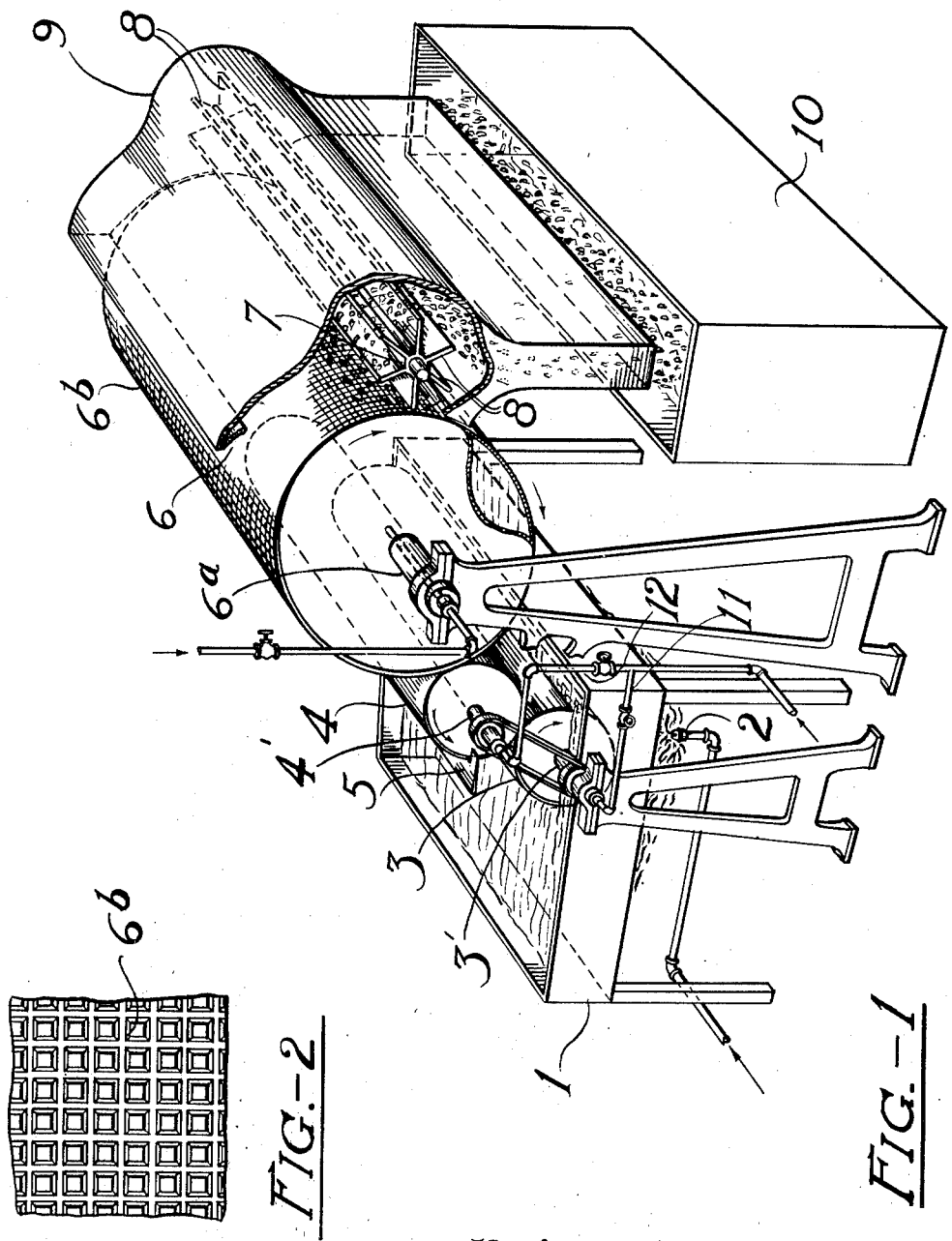
Herbert P. Pearson Inventors
Leroy J. Burrows
By his Attorney Patented Mar. 20, 1934

1,951,769

UNITED STATES PATENT OFFICE 1,951,769

MANUFACTURE OF GRANULAR ASPHALT

Herbert P. Pearson, New York, N. Y., and Leroy J. Burrows, Roselle Park, N. J., assignors to Stanco, Inc.

Application April 12, 1929, Serial No. 354,518

6 Claims. (Cl. 196—22)

The present invention relates to the art of obtaining liquefiable materials in bulky flake-like particles and more specifically comprises the process for obtaining materials such as bitumen, asphalts, glue, soap, and the like in a physical form better adapted for packing, shipping and general use. Our invention also comprises an apparatus for accomplishing our purpose and as a new product, bulky flake-like bitumen. Our invention will be fully understood from the following description and the drawing which illustrates the apparatus.

In the drawing, Fig. 1 is a semi-diagrammatic view in perspective of an apparatus for producing granular materials such as granular asphalt, with parts broken away to more clearly show the construction; and Fig. 2 shows an enlarged view of a portion of the surface of the cylinders from which the asphalt is finally removed.

The present process and apparatus, although described particularly in reference to the manufacture of bulky flake-like asphalt and other bitumens, is applicable with certain modifications to the production of other plastic or glutinous materials in flake-like form, such as soap, glue, and the like, which are not liquefied by moderate rise in temperature, but may be dissolved in aqueous or volatile organic solvents.

Referring to the drawing, reference character 1 designates a vessel containing liquefied asphalt or other material such as a soap solution, as will be understood. The vessel may be heated by a burner 2 or other suitable means, and a cylinder 3 is placed horizontally within vessel 1, partially submerged beneath the surface of the fluid. The cylinder is supported by trunnions 3' and adapted to be revolved by any type of suitable mechanism.

A second cylinder 4 is placed wholly without vessel 1 but with its surface in close proximity to the unsubmerged portion of the surface of cylinder 3. Cylinder 4 may be fitted with an adjustable doctor knife 5 by which a uniform layer of liquid will be held on the surface and excess removed from both the surface and the ends of cylinder 4 as will be described below. Cylinders 3 and 4 may be hollow and may be heated in any suitable way, as by electricity or by hot water admitted through trunnions 3' and 4' from pipes 11 and 12.

A third cylinder 6, preferably considerably larger in diameter than cylinders 3 and 4, is placed with its surface in close proximity to that of cylinder 4. The interior of cylinder 6 is supplied with a cooling medium, such as cold water through trunnion 6a, and the outer surface is scored or cut into small separated areas of high relief, 6b, as illustrated in Fig. 2.

A shaft 7 is placed parallel to the axis of the cylinder with the reticulated surface and blades 8 are fastened radially to the shaft. The distance between the shaft and cylinder is adjusted so that the tips of the blades 8 are in close proximity to the surface of cylinder 6. A shield or hood 9 is placed around shaft 7 and blades 8 to direct the particles of asphalt which are removed from the surface of cylinder 6 by strokes of the blades 8 into the collection vessel 10.

Cylinders 3, 4, and 6, as well as shaft 7, are preferably driven from a single source of power through gears or belts (not shown), the direction of rotation of each being indicated by an arrow. The surface speeds of the cylinders are substantially equal, but the tips of the blades 8 preferably move at a rate higher than that of the surface of cylinder 6.

In the operation of our process, asphalt is kept in a fluid state in the vessel by heat from burners 2 or otherwise. The temperature is preferably about 50 to 200° F. above the melting point of the particular bitumen, which is picked up by cylinder 3 in a smooth layer. Cylinder 4 may be omitted but we prefer to include it in order to obtain a smoother coat of asphalt. Cylinders 3 and 4 may be heated in order to keep the asphalt layer fluid, but temperature should not be raised above the bath temperature and is preferably reduced somewhat.

Cylinder 6 with the reticulated external surface then takes the thin layer of asphalt from cylinder 4 on the high relief areas so that the asphalt is applied over the surface of the cylinder in the form of small scales. A cooling medium is passed into the interior of drum 6 and temperature of the asphalt is reduced below its melting point. The small separate scales are then removed by the revolving blades 8 on the shaft 7 and the material is collected in vessel 10 in the form of small bulky irregular flake-like particles.

In applying our method and apparatus to other materials, such as soaps or glues, the material may be maintained in the vessel 1 in the form of a thick solution with as little water as may be conveniently used, and preferably with such an amount that the material is liquid at the temperature of vessel 1 and solid at room temperature which is attained by cooling in cylinder 6, or may be solidified by such cooling after removal of a small quantity of solvent by heat in drums 3 and 4. The intermediate cylinders are preferably heated and the whole train of cylinders may be placed in a chamber held under reduced pressure if the material be sensitive to elevated temperatures, like gelatin.

We are aware that sheets of bitumen have been prepared before with approximately parallel faces and that such sheets may be broken into small fragments but the product of the present process is in a totally different form. At first appearance the asphalt appears to be in flake-like particles varying in size up to about $\frac{1}{8}''$ diameter, but on closer inspection each of the larger particles will be found to be of an irregular form having a relatively small contacting surface compared to the total surface layer due to the particular method of manufacture whereby a mass of such granules has great bulk compared to its weight, and therefore a greatly reduced tendency for the particles to agglomerate. With slight pressure the particles may be broken into smaller ones of crescent shape. Although moderately soft bitumens may be used in the process, it is particularly advantageous for hard asphalts, for example, with a melting point, by ball and ring method, of about 200 to 350° F. and penetration degree of about 1 to 30 at 77° F. The material has a luster and presents a large surface per unit of weight, for example, having a bulk density of $\frac{1}{3}$ to $\frac{1}{2}$ that of the asphalt in block form. It dissolves more readily and quickly in an appropriate solvent than crushed or broken particles of asphalt, resists packing down or agglomeration, and is of particular advantage in the manufacture of asphaltic paints, cements, rubber and the like.

Our invention is not to be limited by any theory of the mechanism of our process, nor by any illustrative example of the operation, but only by the following claims in which we wish to claim all novelty inherent in the invention.

We claim:

1. An improved process for manufacturing bulky granular asphalt, comprising spreading molten asphalt in a relatively thin layer over a reticulated surface, whereby thin separated flake-like particles are formed, cooling the surface to solidify the asphalt, and removing the same from said surface by lateral pressure whereby the flake-like particles of asphalt are obtained in an irregular bulky form.

2. An apparatus of the class described, comprising a metal plate with a reticulated surface, means for applying liquid material to the surface of the plate in a layer whereby thin, separated, flake-like particles are formed thereon, means for cooling the surface to solidify said liquid, and means for removing the solid therefrom.

3. Apparatus according to claim 2, in which the reticulated surface is in the form of a rotatable cylindrical surface.

4. Apparatus according to claim 2, in which the reticulated surface is in the form of a rotatable cylindrical surface adapted to be cooled interiorly, the means for applying the liquid comprising a second cylinder having its axis parallel to the first, and its surface in close proximity to the reticulated surface, and means for applying liquid to the second cylinder.

5. Apparatus according to claim 2, in which means for removal of solid from the reticulated surface comprises a blade adapted to exert pressure on the solid and to act tangentially to the cylinder.

6. Apparatus of the character described, comprising a cylinder partially submerged in a bath of liquid material, a second cylinder with its surface in close proximity to the unsubmerged portion of the first mentioned cylinder, a third cylinder with a reticulated exterior surface in close proximity with the second cylinder, means for cooling the third cylinder, a shaft fitted with lateral blades adapted to graze the surface of the cylinder with the reticulated surface, the cylinders and shaft having their axes parallel and being adapted to be rotated.

HERBERT P. PEARSON.
LEROY J. BURROWS.